United States Patent [19]

Hardy

[11] 4,166,031
[45] Aug. 28, 1979

[54] ARTIFICIAL KIDNEY CLEANING APPARATUS AND PROCESS

[76] Inventor: Dean Hardy, 209 Jackson Pl., Varsity Courts, Calgary NW. Alberta, Canada

[21] Appl. No.: 758,060

[22] Filed: Jan. 10, 1977

[30] Foreign Application Priority Data

May 21, 1976 [GB] United Kingdom ............... 21174/76

[51] Int. Cl.² ........................ B01D 31/00; B01D 13/00
[52] U.S. Cl. ................................. 210/22 A; 134/22 C; 134/26; 210/81; 210/96.2; 210/140; 210/321 B
[58] Field of Search ............. 210/22, 96 M, 138, 140, 210/321 B, 81; 134/22 R, 22 C, 26, 42; 21/93–98

[56] References Cited

U.S. PATENT DOCUMENTS

| | | |
|---|---|---|
| 3,352,779 | 11/1967 | Austin et al. ................. 210/96 M X |
| 3,441,136 | 4/1969 | Serfass et al. .................... 210/138 X |
| 3,563,381 | 2/1971 | Edelson et al. ............. 210/321 B X |
| 3,753,493 | 8/1973 | Mellor .................... 210/140 |
| 3,871,913 | 3/1975 | Shaldon ....................... 210/321 B X |

*Primary Examiner*—Frank A. Spear, Jr.
*Attorney, Agent, or Firm*—Millen & White

[57] ABSTRACT

An automatic cleaning system for blood dialysis machines comprises a plurality of automatic valves for sequentially passing water, cleaning solution, and sterilizing solution through the dialysate chamber on the one hand, and water and sterilizing solution through the blood chamber on the other hand. The cleaning solution is held in the dialysate chamber to soak the membrane while the water is passed through the blood chamber. The cleaning and sterilizing fluids are supplied to the dialyzer from containers filled with reservoirs of pre-mixed fluids. A water-actuated Venturi fitting is used to withdraw sterilizing and cleaning fluids from the dialyzer.

4 Claims, 4 Drawing Figures

ARTIFICIAL KIDNEY CLEANING APPARATUS AND PROCESS

BACKGROUND OF THE INVENTION

In general when a human being loses his kidney function, unless a suitable kidney transplant is available, he must depend upon the dialysis process to remove the fluids and waste products from his system. This is generally done with a dialyzer machine, one which simulates the kidney function. The machine includes a hemodialyzer unit or dialyzer, which comprises two chambers or lumen, separated by an interface, this interface having the characteristics of a semi-permeable membrane and referred to hereinafter as 'a membrane.' The first chamber receives blood from an artery in the patient under dialysis, and returns blood from that chamber to a vein of the patient. This is done with the arterial blood input connection and the venous blood output connection of the dialyzer. There are two additional connections, input and output dialysate connections, for receiving a dialysate fluid to pass it through the other chamber and out to a drain. This dialysate fluid is an artificial composition, including salts and water, passing adjacent to permeable membrane to remove those components from the blood of a molecular size that can pass through the interstices of the membrane. In general, conventional dialyzer systems provide a lesser pressure on the dialysate side of the membrane than on the blood side, to facilitate the passage of the waste materials and fluids through the membrane for discharge to the drain.

Over the past few years, dialyzers have been significantly improved and brought within a price range as low as $25 to $30. However, even though relatively inexpensive, these dialyzers cannot be used long because of the accumulation of matter in the pores or interstices of the membrane. The efficiency of the dialyzer is rapidly reduced with each dialysis treatment. At the present time, it is a common practice to clean the membrane with a cleaning solution, such as peroxide, which is flushed through the blood chamber. The cleaned dialyzer is then filled with a sterilizing solution, such as formalin. These operations are carried out manually. However the manual cleaning technique is tedious and expensive, more in the occupation of valuable technician time than in the use of fluids in the cleaning. In addition the technician doing the cleaning is exposed to the hepatitis B surface antigen, which is clearly undesirable.

It is therefore the principal object of the present invention to provide an automatic and fast acting cleaner for dialyzers, to substantially reduce the technician time formerly required in dialyzer cleaning.

A preferred object of the invention is to provide effective safeguards for the personnel doing the cleaning against cross-contamination from any bacteria or virus which may be in the dialyzer and the membrane.

Another preferred object of the invention is to provide a cleaner which is simple in design and maintenance and can be operated by relatively unskilled technicians.

It is common in the prior art to use proportioning systems, involving pumps, to supply cleaning and sterilizing fluids to the dialyzer. These proportioning systems are subject to failure and unnoticed loss of efficiency. It is therefore another preferred object of this invention to provide a cleaner having a system for supplying these fluids which is characterized by a high degree of reliability and consistent performance and provides solutions of constant composition.

Another preferred object of the present invention is to produce a cleaner which minimizes the possiblity of high-pressure cycles, or a significant pressure unbalance across the membrane which might reduce the efficiency of the dialyzer.

Another preferred object of the invention is to provide such a dialyzer cleaner which is readily modified to change the cleaning cycle or sequence as new techniques and substances are developed.

SUMMARY OF THE INVENTION

In accordance with the present invention, a dialyzer cleaner is provided characterized by the following combination of essential features:

(a) Cleaning solution, such as peroxide, is supplied to the dialysate side of the dialyzer membrane. It has been found that the removal of blood residue on the opposite side of the membrane is accelerated when the solution diffuses or soaks into the membrane and works from beneath to release the residue.

(b) The system utilizes automatically operated on-off flow-control means, such as solenoid-operated valves, to regulate fluid flow through the dialyzer chambers in a predetermined sequence. Thus (i) water may be passed through both chambers to rinse them, (ii) the dialysate chamber may then be filled with a cleaning solution while water is flowed through the blood chamber, thereby allowing the solution to soak into the membrane to loosen blood residue trapped in it and permit said residue to be carried away by the water, and (iii) a sterilizing solution may then be introduced to fill both chambers. By utilizing an automatically operated system and soaking the membrane in cleaning solution from the dialysate side, technician time has been reduced.

(c) The cleaner also incorporates means, operated by municipal water, for exerting suction at the outlets from the dialyzer chambers. Such means may comprise a Venturi system connected into the drain means leading from the chamber outlets to a drain zone. Said suction means function to draw the cleaning and sterilizing solutions through the dialyzer chambers. Thus a mechanically consistent and simple arrangement is provided.

In another preferred aspect of the invention, containers are provided filled with pre-mixed bodies or reservoirs of cleaning and sterilizing solutions. In contrast to the proportioning pump systems used in the prior art, a cleaning solution of known composition is available at consistent flow rates from the present system.

In summary, the present invention provides a mechanically simple cleaner which quickly, automatically and efficiently cleans dialyzers. It is capable of cleaning a dialyzer in 24 minutes with technician time involvement of 5 minutes and a single dialyzer can be cleaned by it for re-use as many as 6 times without serious impairment of dialysis capability. In contrast, the prior art, commercially available systems pass the cleaning solution only through the blood chamber during cleaning, are manually operated, and use pumping systems which gradually deteriorate in use. These prior art systems commonly take 48 minutes with technician time involvement of 24 minutes to clean a dialyzer and the latter can only be cleaned about 3 times before its dialysis efficiency is impaired too seriously to permit its further use.

Broadly stated, the invention is a cleaner for a dialyzer of the type having blood and dialysate chambers separated by a membrane, input and output dialysate connections respectively leading in and out of the dialysate chamber, and arterial blood and venous blood connections respectively leading in and out of the blood chamber, which cleaner comprises: first means for supplying dialyzer cleaning fluid only to the dialyzer input dialysate connection; second means for supplying dialyzer sterilizing fluid to the input dialysate and arterial blood connections; third means for supplying pressurized water to the input dialysate and arterial blood connections; drain line means for discharging fluid from the output dialysate and venous blood connections; means, connected with the drain line means and connectable to a source of and operated by pressurized water, for exerting suction at the venous blood and output dialysate connections; a plurality of on-off flow-control units, connected to permit the flows of water to the chambers and suction means, the flow of cleaning fluid to the dialysate chamber, and the flow of sterilizing fluid to the chambers; and a timer unit which, when actuated, automatically actuates the flow-control units and suction means, whereby a pre-determined sequence of water, cleaning fluid and sterilizing fluid flows through the dialysate chamber and water and sterilizing fluid flows through the blood chamber may be carried out to clean the membrane to prepare it for re-use.

THE DRAWINGS

Further objects and aspects of the invention will be understood in the light of the following description, taken in conjunction with the accompanying drawings, in the several figures of which like reference numerals identify like components, and in which.

DETAILED DESCRIPTION OF THE INVENTION

Figure 3:
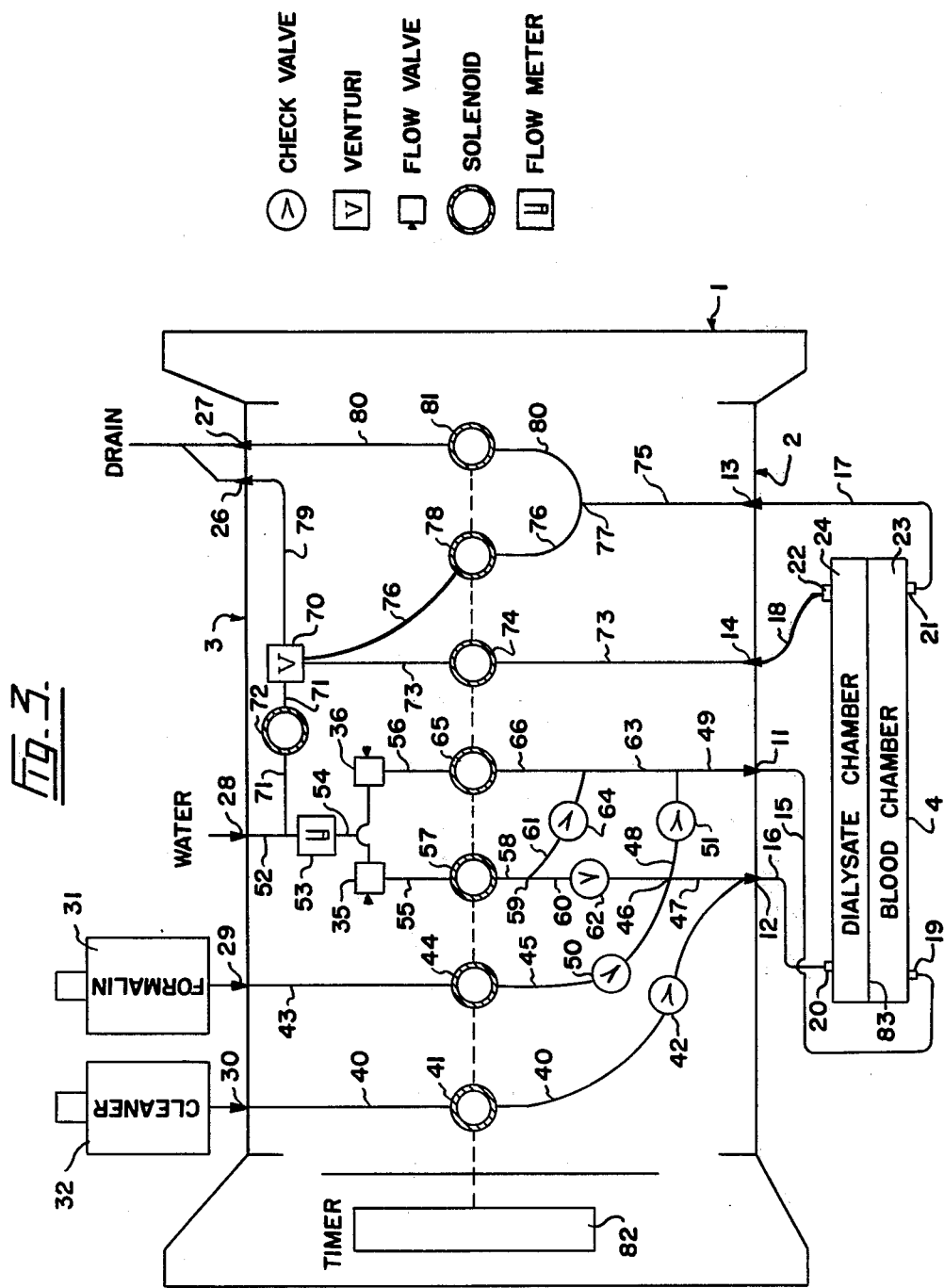
FIG. 3 is a flow diagram depicting the flow paths for the liquids through the cleaner, dialyzer, and back through the cleaner to the drain.

FIG. 3 shows a dialyzer cleaner 1 having front and rear panels 2, 3. The cleaner is connected to a conventional dialyzer 4 having blood and dialysate chambers 23, 24 separated by a membrane 83.

Figure 1:
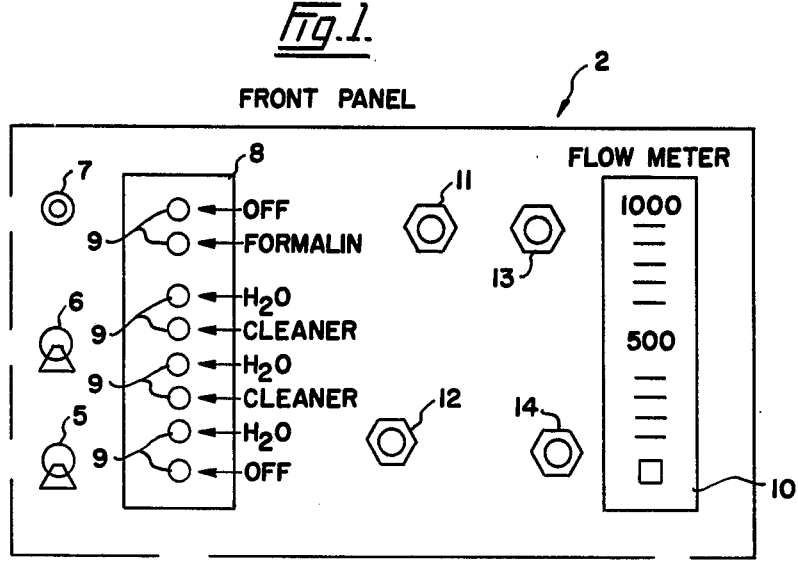
FIGS. 1 and 2 are front and rear views showing, respectively, the front and rear panels of the cleaning system constructed in accordance with the invention.
Figure 2:
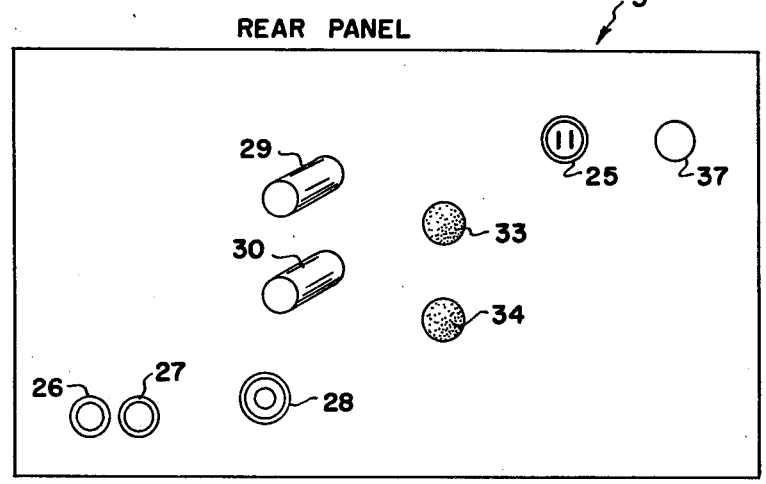

Turning to the cleaner front panel connections shown in FIG. 1, there is shown a power on-off switch 5 and an automatic manual selection switch 6. The selection switch is operable to cause the cleaner to cycle automatically through the cleaning sequence or to remain in one cycle until manually advanced by pushing the start-advance button 7. An array 8 of visual indicators 9 is provided to indicate in which cycle the cleaner presently is, by illuminating one of the indicators. A flow meter scale 10 is also provided to indicate the water flow through the device.

There are four tubing connections 11, 12, 13, 14 projecting from the cleaner front panel. These connections are respectively termed the cleaner output connection for the blood chamber, the cleaner output connection for the dialysate chamber, the cleaner return connection for the blood chamber, and the cleaner return connection for the dialysate chamber.

There are also four tubing connections 19, 20, 21, 22 projecting from the dialyser. These connections are respectively termed: the dialyzer arterial blood connection 19, which leads into the blood chamber; the dialyzer input dialysate connection 20, which leads into the dialysate chamber; the dialyzer venous blood connection 21, which leads out of the blood chamber; and the dialyzer output dialysate connection 22, which leads out of the dialysate chamber.

The cleaner connections 11, 12, 13, 14 are connected to the dialyzer connections 19, 20, 21, 22 by the conduits or lines 15, 16, 17, 18 respectively.

Dealing now with the connections at the rear panel of the cleaner, there is shown a 110 volt receptacle 25 for receiving electrical power. A pair of drain hose connections 26, 27 are provided at the lower left. A water inlet connection 28 is provided to connect the cleaner with a municipal water tap (not shown) supplying pressurized water. Tubular inlets 29, 30 are provided to receive a corresponding tubular spout (not shown) of the sterilizing and cleaning fluid containers 31, 32, to be described hereinafter. A pair of adjusting knobs 33, 34 extend inwardly and are attached to flow control valves 34, 36 which will be discussed below. A conventional fuse holder receptacle 37 is also provided in the rear panel.

Thus, water, sterilizing and cleaning fluids or solutions, and electrical power are supplied to the cleaner, the cleaner is connected with the input and output connections of both chambers of the dialyzer, and fluids can drain from the cleaner.

Turning now to the cleaner illustrated in FIG. 3, means are provided for supplying a dialyzer cleaning fluid, such as peroxide, to the dialyzer input dialysate connection 20, and thus to the dialysate chamber of the dialyzer. Such means may comprise a container 32, containing a reservoir of pre-mixed cleaning fluid. This container feeds the fluid through the inlet 30 into line 40 to the cleaner output connection 12 for the dialysate chamber. From connection 12, the fluid passes through line 16 to dialyzer input dialysate connection 20. Flow from the container through line 40 is controlled by a solenoid-operated valve 41. Back flow from the connection 12 through line 40 is prevented by check valve 42.

Means are also provided for supplying a sterilizing fluid, such as formalin, to the dialyzer arterial blood connection 19 and input dialysate connection 20, and thus to the blood and dialysate chambers. In the embodiment shown, such means comprise a container 31, containing a reservoir of pre-mixed sterilizing fluid. This container feeds the fluid through a line 43, solenoid-operated valve 44, and line 45 to a junction 46. At this junction, line 45 branches into line 47, which leads into the cleaner output connection 12 for the dialysate chamber, and into line 48, which connects in turn with line 49 leading into the cleaner output connection 11 for the blood chamber. A pair of check valves 50, 51 control back flow through lines 47 and 49 respectively. Line 15 connects the cleaner output connection 11 with the dialyzer arterial blood connection 19, and line 16 connects the cleaner output connection 12 with the dialyzer input dialysate connection 20 to complete the circuit.

Means are also provided for supplying pressurized water to the dialyzer input dialysate and arterial blood connections 11, 12. In the embodiment illustrated, such means comprise the cleaner water inlet connection 28, which can be connected to a municipal water tap. This connection leads into a line 52 which connects with a flow meter 53 for recording the water flow and displaying it on the flow meter scale 10. Water leaves the flow meter through line 54 which branches into lines 55, 56. Line 55 leads through flow valve 35, controlled by knob 33, and connects with solenoid-operated valve 57. A line 58 extends from the output side of valve 57 and branches at 59 to form lines 60, 61. Line 60 merges into line 47 and is thereby connected to the cleaner output connection 12 for the dialysate chamber. A check valve 62 prevents back flow through line 60. The line 16 connects the connection 12 with the dialyzer input dialysate connection 20 to complete one portion of the circuit. Turning to line 61, it connects with line 63 which merges into line 49 to connect with the cleaner output connection 11 for the blood chamber. A check valve 64 prevents back flow through line 61. The line 15 connects connection 11 with the dialyzer arterial blood connection 19, to complete the other portion of the circuit. By the system described, water may be supplied to both the dialysate and blood chambers at the same time.

Returning to line 56, it leads through flow valve 36, controlled by knob 34, and connects with solenoid-operated valve 65. A line 66 extends from the output side of the valve 65 and merges into line 63. Line 63 merges into line 49 which connects with connection 11 and line 15, thereby permitting water to be supplied solely to the dialyzer arterial blood connection 19.

The flow valves 35, 36 can be set so that there is a slow flow of water through the blood chamber only, with a greater flow of water being passed through both chambers simultaneously for rinsing.

Drain line means are provided for discharging the fluids issuing from the dialyzer venous blood connection 21 and the dialyzer output dialysate connection 22. Means, connected with the drain line means and connectable to a source of and operated by pressurized water, are provided to exert suction at the dialyzer venous blood and output dialysate connections. In the embodiment shown, the drain line means comprises a two path system, whereby water moving through the blood chamber may be transported directly to a drain zone and fluids being drawn out of the dialyzer by the suction means may also be discharged to the drain zone.

More particularly, the suction means may comprise a Venturi fitting 70 connected by a line 71 to the line 52. The flow of water through line 71 to the Venturi fitting is controlled by a solenoid-operated valve 72.

This Venturi fitting draws fluid through either the blood or dialysate chambers or both of them. More particularly, fluid may be drawn from the dialyzer output dialysate connection 22, through line 18, cleaner return connection 14, line 73, and valve 74 to the fitting. Flow through this line is controlled by the solenoid-operated valve 74. Fluid may also be drawn from the dialyzer venous blood connection 21, through line 17, cleaner return connection 13, and line 75 to junction 77 and then through line 76 and valve 78 to the fitting. Flow through line 76 is controlled by solenoid-operated valve 78. The Venturi fitting discharges through line 79 to drain hose connection 26 which can be connected to a drain zone.

A second drainage path, for water moving through the blood chamber, is also provided. The line 80 branches from junction 77 and leads to drain hose connection 27. Flow through line 80 is controlled by the solenoid-operated valve 81.

The on-off flow-control units, exemplified in the embodiment shown in the form of solenoid-operated valves, are operative to control the flows of water to the chambers and the suction means. They also control the flow of the cleaning fluid to the dialysate chamber and the flow of sterilizing fluid to both chambers. These units and the suction means are, in turn, automatically regulated or operated by a timer unit 82, exemplified in FIG. 4, whereby a pre-determined sequence of water, cleaning fluid and sterilizing fluid flows through one or both of the dialyzer chambers may be carried out to clean the membrane 83 for re-use.

For purposes of the claims, it will be noted that first and second line means respectively connect the dialyzer output dialysate connection 22 and the venous blood connection 21 with the suction means comprising the Venturi fitting 70. In the version illustrated, the first line means comprises line 18, connection 14, line 73 and valve 74. The second line means comprises line 17, connection 13, line 75, line 76 and valve 78. Discharge means connect the Venturi fitting with a drain zone, for the delivery of discharged fluid from the former to the latter. Such discharge means comprise the line 79 and connection 26.

It will also be noted that fourth line means, connectable to a source of pressurized water, is provided. In the embodiment shown, said fourth line means comprises line 52, flow meter 53, line 54, line 55, valves 35 and 57, line 55, and line 58. Fifth and sixth line means connect the fourth line means with the dialyzer input dialysate and arterial blood connections respectively. Said fifth line means as shown comprises line 60, the valve 62, line 47, connection 12 and line 16. Said sixth line means as shown comprises line 61, valve 64, line 63, line 49, connection 11 and line 15. Also, a seventh line means, connectable to a source of pressurized water, connects with the dialyzer arterial blood connection. Said seventh line means, as shown, comprises line 56, valve 36, line 56, valve 65, line 63, line 49, connection 11 and line 15.

METHOD OF OPERATION

Figure 4:
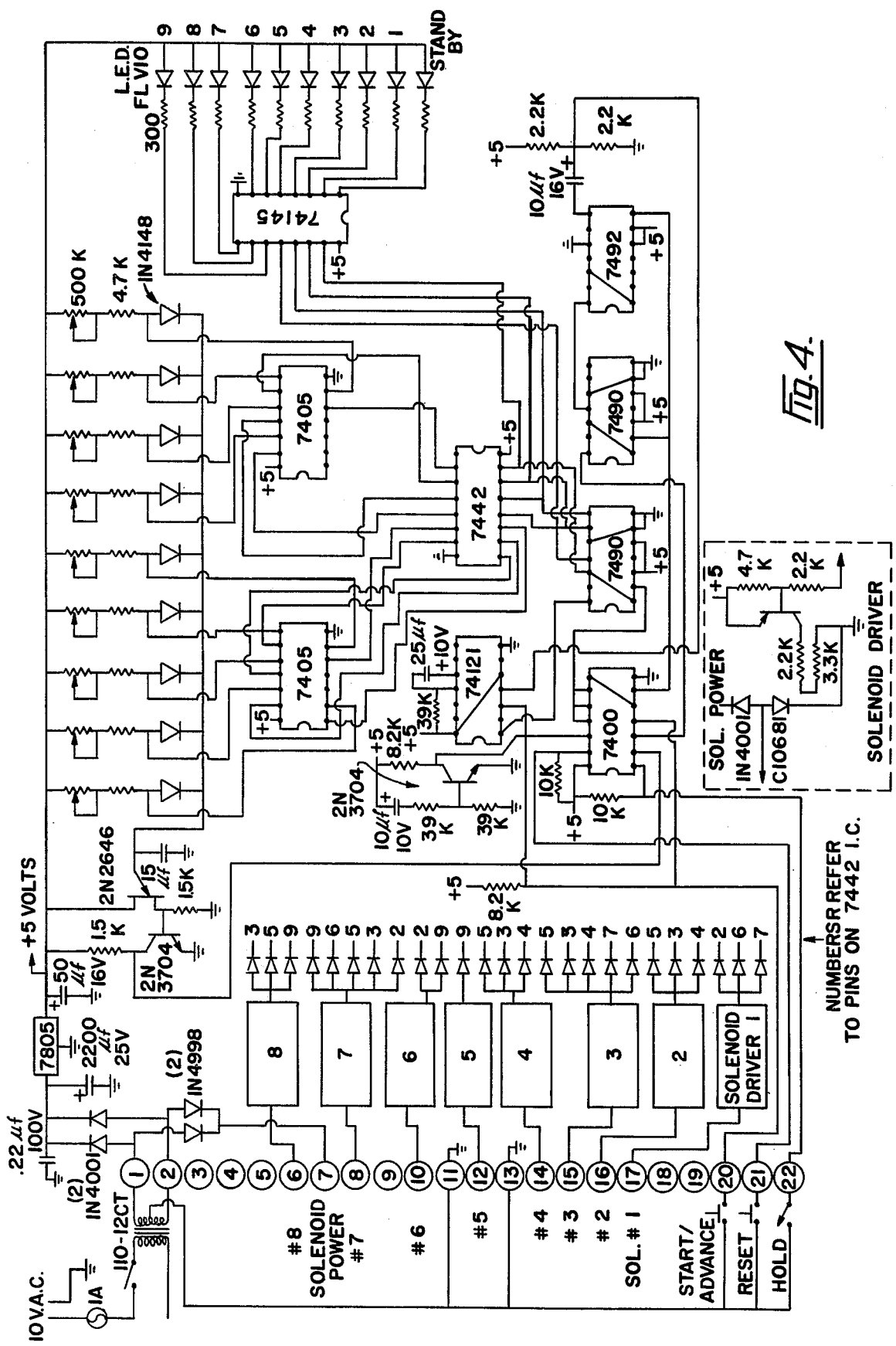
FIG. 4 is a schematic diagram, depicting circuit details of the timer and the other electronic components of the inventive cleaning system.

For purposes of this explanation, the fluid flow path, shown in FIG. 3 is all that is required. The detailed schematic diagram of FIG. 4 is included to provide those skilled in the art with a clear teaching of the best mode now known for making and using the invention. The 2N3704 NPN-type driver transistor and the associated 2N2646 unijunction transistor shown in the upper left portion of FIG. 4 comprise a timing means which provides timing pulses which are counted down by the electronics, including the integrated circuit packages shown and separately labeled in the drawing. These pulses are accumulated to regulate the sequence of operation through the six separate cycles of the dialyzer cleaner. The diode combinations shown to the right of the solenoid driver circuits have numbers associated with the IC 7442 near the right center portion of the diagram. As new materials are discovered and different types of membranes inserted in various dialyzers, it is possible to vary the sequence of the timing by changing circuit components associated with the unijunction transistor and the charging capacitor in a well known manner, or changing the number of pulses which must be received by the different divide-down circuits before a specific solenoid driver circuit is energized. Likewise the connections to the 7442 stage can be simply changed to energize the solenoids in different combinations during different cycles. This allows a maximum flexibility for the inventive system and enables it to be upgraded and changed to keep abreast of the advancing technology, both as to cleaning materials and the membrane itself.

Considering the first cycle of operation in connection with the showing of FIG. 3, the signals from the timer 82 are used to open the valves 57, 74 and 78 for four minutes. Tap water at about 20 to 40 psi is received from any municipal water source at the water inlet connection 28. Because the valve 72 is not energized, there is no passage of water through the main flow path of the Venturi fitting 70 at this time. Instead the water flows through the line 52, flow meter 53, line 54, line 55, flow control valve 35 and line 58. At 59 it divides. Part of the water passes through line 60, valve 62, line 47 and line 16 to arrive at the dialyzer input dialysate connection 20, through which it enters the dialysate chamber 24. The other part of the water passes through line 61, valve 64, line 63, line 49 and line 15 to arrive at the dialyzer arterial blood connection 19, through which it enters the blood chamber 23. As the flow rate through the flow control valve 35 is about 1200 cc (or milliliters) per minute, this branching provides flow rates of about 600 cc per minute through each of the dialyzer chambers. The flow rates can be adjusted to insure that the differential pressure across the membrane 83 in the dialyzer is kept at less than about three psi.

The water passes out of the dialyzer through the venous blood connection 21 and output dialysate connection 22. The water leaving the dialysate chamber passes through line 18, connection 14, line 73, valve 74, and the balance of line 73 to one suction input connection of the Venturi fitting. The water leaving the blood chamber passes through line 17, connection 13, line 75, line 76, valve 78 and the balance of line 76 to another suction input connection of the Venturi fitting. This water received at the fitting is passed through line 79, drain connection 26 and a drain line to a drain zone. At this time the movement of the fluids through the suction input connections of the Venturi fitting is solely under the municipal water pressure. There is no water passage through the main fluid path of the Venturi fitting, as valve 72 is closed. Thus there is no suction pressure developed to pull the water into the Venturi fitting. During this four minute water rinse, the loose blood in the dialyzer is generally washed out within about the first 30 seconds, and the additional 3½ minutes is utilized for a thorough rinse of that blood which is easy to wash out.

At the end of the first cycle, valves 57 and 78 are closed, while valve 74 remains open. In addition valves 65, 81, 41 and 72 are opened. The second cycle is maintained for about 1 minute. The opening of valve 41 allows cleaning fluid from the container 32 to flow through the connection 30, line 40, valve 41, line 40, check valve 42, connection 12 and line 16 into the dialyzer input dialysate connection 20. With valve 65 open, water passes through the flow valve 36 and valve 65 into the arterial blood input connection 19 of the dialyzer. The opening of valves 74 and 72 causes suction to be effected by the Venturi fitting at the dialyzer output dialysate connection 22 to draw dialyzer cleaning fluid through the dialysate chamber and deliver it to the drain zone. With suction drawing cleaning fluid through the dialysate chamber, there is a slight pressure unbalance across the membrane 83 which draws cleaning fluid through the membrane and clears debris from the membrane interstices. The debris gradually floats into the blood chamber and is flushed out by the water to the drain zone. An initial rush of blood and protein fiber has been noticed in the water at the beginning of this cycle, and this gradually diminishes over the one minute of the cycle.

At the end of the second cycle, the valves 74 and 72 are closed while the valves 65, 81 and 41 are allowed to remain open for two minutes during the third cycle. Closure of valves 74, 72 stops the flow of the cleaning fluid, but the dialysate chamber is filled with it. Water is still flowing through the blood chamber and into the drain. This water is moving at a substantially slower rate, about 500 cc per minute, as contrasted to the 1200 cc per minute water rinse rate of the first cycle. Blood, loosened by the action of the cleaning fluid soaking the membrane and the water movement itself, is flushed out of the chamber.

At the end of the third cycle, the fourth cycle is commenced by again opening valves 74 and 72 as valves 65, 81 and 41 remain open. It is apparent that this is the same combination of valve openings utilized in the second cycle, and there is again a one minute duration for the fourth cycle, as the cleaning fluid is moved through the system as previously described.

To initiate the fifth cycle, valves 65, 81, 41 and 72 are closed, leaving valve 74 open. In addition valves 57 and 78 are opened, and this is the same valve opening combination as used in the first cycle to effect a water rinse through the higher-rate flow valve 35 of the system. This water rinse of both sides of the membrane in the dialyzer is continued for 10 minutes to remove the cleaning solution and give a last, high flow rate wash of the unit.

For the sixth and last cycle, valve 57 is closed while valves 44 and 72 are opened, valves 74 and 78 remaining open. This allows the sterilizing fluid to be drawn from the container 31 through the valve 44 and provide sterilization in both chambers of the dialyzer and out, through the Venturi fitting and the drain lines. This sterilization cycle occurs for two minutes.

It appears that the cleaning action is enhanced by using the low-rate water flow through the blood compartment of the dialyzer in the third cycle, as described above. In effect the second cycle for one minute is utilized to fill the dialyzer with the concentrated cleaning solution. The third cycle amounts to a soaking action, during which time nothing is entering the dialysate compartment and the water is being flowed slowly through the blood compartment. Thus the cleaner solution begins to percolate or migrate through the membrane, allowing a concentrating contact of the cleaning solution with the blood debris, on the blood compartment side of the membrane. In the next cycle, the water is then used to wash away the debris that is loosened, and also remove the reaction products which occur by the cleaning fluid contacting the blood debris.

TECHNICAL ADVANTAGES

An important advantage of the present invention is the fluid movement only by water pressure and the suction developed by the Venturi fitting. This has eliminated the use of motors, pumps and other moving parts associated with prior art arrangements. The low flow rate through the system with the Venturi fitting allows a maximum pressure of $-50$ millimeters of mercury within the dialyzer being cleaned. A pressure relief valve can be simply incorporated into the blood circuit to de-energize the equipment in the event a pressure exceeding 160 millimeters of mercury is sensed. With the use of the Venturi fitting in this simple water pressure arrangement, a cleaner is provided that is suitable for easy operation by technicians and admits of ready maintenance. There are effective cross-contamination safeguards, in that the semi-rigid tubing utilized to provide the interconnections between the cleaner system and the dialyzer can be discarded after each use. There has been a substantial reduction in the time required to effect each cleaning, with a consequent economic savings. It is important to note that the circuit arrangement shown in FIG. 4 admits of simple modification to change the timing and/or solenoid combinations, thus facilitating changes of the equipment in the future.

While only a particular embodiment of the invention has been described and illustrated, it is apparent that various modifications and alterations can be made therein. It is therefore the intention in the appended claims to cover all such modifications and alterations as may fall within the true spirit and scope of the invention.

What is claimed is:

1. A cleaner for a dialyzer of the type having blood and dialysate chambers separated by a membrane, input and output dialysate connections respectively leading in and out of the dialysate chamber, and arterial blood and venous blood connections respectively leading in and out of the blood chamber, which cleaner comprises:

first means comprising a reservoir container for supplying pre-mixed dialyzer cleaning solution from said container only to the dialyzer input dialysate connection;

second means comprising a reservoir container for supplying pre-mixed dialyzer sterilizing solution from said second container to the input dialysate and arterial blood connections;

third means for supply pressurized water to the input dialysate and arterial blood connections;

drain line means for discharging fluid from the output dialysate and venous blood connections;

means, connected with the drain line means and connectable to a source of and operated by pressurized water for exerting suction at the venous blood and output dialysate connections;

a plurality of on-off flow-control units, connected to control the flows of water to the chambers and suction means, the flow of cleaning solution to the dialysate chamber, and the flow of sterilizing solution to the chambers; and a timer unit which, when actuated, automatically actuates the flow-control units and suction means, whereby a pre-determined sequence of water, cleaning solution and sterilizing solution flows through the dialysate chamber and water and sterilizing solution flows through the blood chamber may be carried out to clean the membrane to prepare it for reuse.

2. The method of cleaning a dialyzer having a permeable membrane separating a blood chamber and a dialysate chamber, comprising the steps of:

(a) flowing pressurized water through the blood and dialysate chambers, to remove loose blood;

(b) drawing pre-mixed cleaning solution from a container through the dialysate chamber, while simultaneously flowing pressurized water through the blood chamber, thereby allowing the cleaning solution to fill the dialysate chamber and to begin to diffuse through the membrane;

(c) flowing pressurized water through the blood chamber, while holding cleaning solution in the dialysate chamber to soak the membrane; and (d) again flowing pressurized water through said blood chamber to remove loosened debris.

3. A method of cleaning a dialyzer as claimed in claim 2, in which after step (c) and before step (d), cleaning fluid is again drawn through the dialysate chamber.

4. A method of cleaning a dialyzer as claimed in claim 2,, in which after step (d), sterilizing solution is drawn through both the blood and dialysate chambers.

* * * * *